US008650478B2

(12) United States Patent (10) Patent No.: US 8,650,478 B2
Olawsky et al. (45) Date of Patent: *Feb. 11, 2014

(54) UNIFIED MANAGEMENT OF CONTEXTUAL INFORMATION FOR A USER INTERACTION IN AN HTML INTERFACE

(75) Inventors: Duane E. Olawsky, Eden Prairie, MN (US); Steven L. Chesney, Brooklyn Park, MN (US); Paul D. Close, Shoreview, MN (US); Paul A. Palmer, Eagan, MN (US); John D. Somsky, Hugo, MN (US); Janardhanam Vijayakumar, Blaine, MN (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1033 days.

This patent is subject to a terminal disclaimer.

(21) Appl. No.: 12/705,820

(22) Filed: Feb. 15, 2010

(65) Prior Publication Data

US 2010/0138737 A1 Jun. 3, 2010

Related U.S. Application Data

(63) Continuation of application No. 10/284,015, filed on Oct. 30, 2002, now Pat. No. 7,689,902.

(51) Int. Cl.
*G06F 3/00* (2006.01)
(52) U.S. Cl.
USPC .......................................................... 715/234
(58) Field of Classification Search
USPC .................................. 715/234, 243, 254, 255
See application file for complete search history.

(56) References Cited

U.S. PATENT DOCUMENTS

| 6,003,046 | A | 12/1999 | Nielsen |
| 6,098,064 | A | 8/2000 | Pirolli et al. |
| 6,154,751 | A | 11/2000 | Ault et al. |
| 6,167,409 | A | 12/2000 | DeRose et al. |
| 6,546,406 | B1 | 4/2003 | DeRose et al. |
| 7,689,902 | B1* | 3/2010 | Olawsky et al. ............... 715/234 |
| 2002/0107875 | A1* | 8/2002 | Seliger et al. ................. 707/200 |
| 2002/0129153 | A1 | 9/2002 | Fleming |
| 2003/0001875 | A1 | 1/2003 | Black et al. |
| 2003/0023949 | A1 | 1/2003 | Hagmeier et al. |
| 2003/0065826 | A1 | 4/2003 | Skufca et al. |
| 2003/0113727 | A1* | 6/2003 | Girn et al. .......................... 435/6 |
| 2003/0158839 | A1 | 8/2003 | Faybishenko et al. |
| 2003/0208530 | A1 | 11/2003 | Bhogal et al. |
| 2004/0205119 | A1* | 10/2004 | Streble et al. ................. 709/203 |

OTHER PUBLICATIONS

Javaserver Pages, Whitepaper, "Developing Web-based Application: A Background", 1999, p. 1-10.

(Continued)

*Primary Examiner* — Kyle Stork

(57) ABSTRACT

A system and method for context management which addresses the above problems while isolating the context management functions from the other functional code found on the server system. The context management system includes a context manager component which stores and retrieves name-value pairs describing the context in which the current request is being processed. In doing so, three types of context data are distinguished: static, dynamic, and transient. The context manager stores context data regarding each of a user's sessions and page flows, and returns context data in response to requests from the server system. Using this context data, the server system can then interact with the user in a manner appropriate to the user's context.

20 Claims, 3 Drawing Sheets

(56) References Cited

OTHER PUBLICATIONS

Javaserver Pages, Whitepaper, "Comparing Methods for Server-Side Dynamic Content White Paper", Jan. 2000, p. 1-8.

"The Java Servlet API", 2000, p. 1-14.

Javaserver Pages, Whitepaper, Servlet Developer White Paper, Nov. 1999, p. 1-3.

* cited by examiner

UNIFIED MANAGEMENT OF CONTEXTUAL INFORMATION FOR A USER INTERACTION IN AN HTML INTERFACE

CROSS-REFERENCE TO RELATED APPLICATIONS

This patent application is a continuation of U.S. patent application Ser. No. 10/284,015, filed Oct. 30, 2002, which is hereby incorporated by reference.

TECHNICAL FIELD OF THE INVENTION

The present invention is directed, in general, to an improved system and method for user interactions with computer systems and, more specifically, to a system and method for management of contextual information for a user interaction in a markup-language-based interface.

BACKGROUND OF THE INVENTION

Electronically published documents are increasingly being made available using a general markup language. A markup language provides indications of structure of the document, but excludes streams of graphic display instructions, which are typically found in formatted documents. Markup languages are more portable between a variety of different machines that may use different graphic display commands. A commonly used markup language is the Standardized General Markup Language (SGML), an ISO standard.

Client-server computer systems for electronically publishing documents have also become increasingly available. Such a system typically includes one computer system (the server) on which documents are stored so that other computer systems (the clients) can access the information. The server and client communicate via messages conforming to a communication protocol sent over a communication channel such as a computer network. The server responds to messages from clients and processes requests to transmit a requested document.

An example of a client-server computer system for retrieval of electronically published documents that use a markup language is the World Wide Web (WWW or "web") on the Internet. The WWW is a "web" of interconnected documents that are located in various sites on the Internet. Documents that are published on the WWW are written in the Hypertext Markup Language (HTML) or Extensible Markup Language (XML). HTML documents stored as such are generally static, that is, the contents do not change over time unless the publisher modifies the document.

HTML is a markup language used for writing hypertext documents. HTML documents are SGML documents that conform to a particular Document Type Definition (DTD). An HTML document includes a hierarchical set of markup elements, where most elements have a start tag, followed by content, followed by an end tag. The content is a combination of text and nested markup elements. Tags are enclosed in angle brackets ('<' and '>') and indicate how the document is structured and how to display the document, as well as destinations and labels for hypertext links. There are tags for markup elements such as titles, headers, text attributes such as bold and italic, lists, paragraph boundaries, links to other documents or other parts of the same document, in-line graphic images, and many other features. While there are differences between HTML, SGML, and XML languages, in this document, the term "HTML" will be used in a generic sense to refer to all markup-language-based documents, whether or not they are specifically written in HTML.

An Internet site which electronically publishes documents on the WWW is called a "Web site" and runs a "Web server," which is a computer program that allows a computer on the network to make documents available via the WWW. The documents are often hypertext documents in the HTML or XML language, but may be other types of documents.

A user (typically using a machine other than the machine used by the Web server) accesses documents published on the WWW by using a client program called a "Web browser." The Web browser allows the user to retrieve and display documents from Web servers. Two of the most popular Web browser programs are the Navigator browser from Netscape Communications, Corp., of Mountain View, Ca. and the Internet Explorer browser from Microsoft Corp. of Redmond, Wa.

The Web server and the Web browser communicate using the Hypertext Transfer Protocol (HTTP) message protocol and the underlying TCP/IP data transport protocol of the Internet. HTTP is described in Hypertext Transfer Protocol—HTTP/1.0 by T. Berners-Lee, R. T. Fielding, H. Frystyk Nielsen, Internet Draft Document, Dec. 19, 1994, and is currently in the standardization process. In HTTP, the Web browser establishes a connection to a Web server and sends an HTTP request message to the server. In response to an HTTP request message, the Web server checks for authorization, performs any requested action and returns an HTTP response message containing an HTML document resulting from the requested action, or an error message. For instance, to retrieve a static document, a Web browser sends an HTTP request message to the indicated Web server, requesting a document by its URL. The Web server then retrieves the document and returns it in an HTTP response message to the Web browser. If the document has hypertext links, then the user may again select a link to request that a new document be retrieved and displayed. As another example, if a user completes in a form requesting a database search, the Web browser sends an HTTP request message to the Web server including the name of the database to be searched and the search parameters and the URL of the search script. The Web server calls a program or script, passing in the search parameters. The program examines the parameters and attempts to answer the query, perhaps by sending a query to a database interface. When the program receives the results of the query, it constructs an HTML document that is returned to the Web server, which then sends it to the Web browser in an HTTP response message.

The terms "applet" and "servlet" are established terms in the Java programming language art and will be used herein, since the terms have meaning to those skilled in this art. "Applet" refers to an independent software module that runs within a Java-enabled web browser. Servlet refers to a software module that resides on a Java enabled web server. It is to be understood that the use of the terms "applet" and "servlet" herein is not intended to limit the invention in any way. For clarification, the phrase "configuration applet" is used herein to refer to a software module used to configure preferences for an end user software application such as a word processor, a database manager, etc. Since software applications are also "applets" in the Java environment, the phrase "user applet" or just "applet" is used herein to refer to an end user application. It should be understood, however, that within the context of this application, "applet" and "servlet" are used in a generic sense, and are not limited to Java-based systems or environments.

Common Gateway Interface (CGI) programs are an important part of the HTTP server function. CGI is a World Wide Web standard for extending HTML functionality. CGI processing typically involves the combination of a live Web server and external programming scripts or executables. In particular, CGI programs are typically used to return dynamic information and to respond to HTTP browser input in HTML forms.

While markup-language-based documents were originally developed for easy and universal access to documents over the web, currently many standalone computer applications and other documents are written to interact with the user in HTML, so that any user can access them using a standard web browser. As such, it has become increasingly important to provide the user with a robust and intelligent interaction via his web browser. To do so, the server system, whether remote or embodied in a local application, must be able to manage the user's navigation and use of the HTML documents in context.

The content and behavior of a web page within a complex application may depend upon a variety of contextual factors, including the privileges of the user, the software products installed, the sequence of pages shown previously in the browser window (i.e. page flow), and the data entered on these pages. A page flow dependency may extend multiple pages in the page flow. If a user is working in multiple browser windows, each has its own independent page flow, and therefore its own context. In addition, web browsers provide mechanisms such as "Back" and "Forward" buttons and menus of recently visited pages that allow a user to display a different page without interacting with the web server providing those pages. The page from which a new request is made is an important part of the page flow, and any mechanism for tracking the page flow context must function correctly even when these browser features are used.

Since a web server may concurrently serve a large number of users, scalability is also a concern. The amount of contextual data stored for each user must not grow too large. Since a user can in principle return at any time to a page previously displayed within the session, it is generally not safe to dispose of any contextual data until the session is ended. Contextual data could be written to disk, but this increases the complexity of the system and could affect performance.

Although servlets provide storage locations with a variety of scopes (page, request, session, and application), none of these is satisfactory by itself for page flow contextual data. The lifetime of this contextual data is longer than a single request. Storing it on the session threatens scalability since a page flow context must be stored for each page that has been sent to the user. Even when this is tolerable it is still necessary to identify which page flow context to use for any given request.

There is, therefore, a need in the art for a system and method for the unified management of contextual information for a user interaction in an HTML interface.

SUMMARY OF THE INVENTION

To address the above-discussed deficiencies of the prior art, it is a primary object of the present invention to provide an improved system and method for user interactions with computer systems. It is another object of the present invention to provide a system and method for management of contextual information for a user interaction in a markup-language-based interface.

The preferred embodiment provides a system and method for context management which addresses the above problems while isolating the context management functions from the other functional code found on the server system. The context management system includes a context manager component which stores and retrieves name-value pairs describing the context in which the current request is being processed. In doing so, three types of context data are distinguished: static, dynamic, and transient. The context manager stores context data regarding each of a user's sessions and page flows, and returns context data in response to requests from the server system. Using this context data, the server system can then interact with the user in a manner appropriate to the user's context.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as will as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
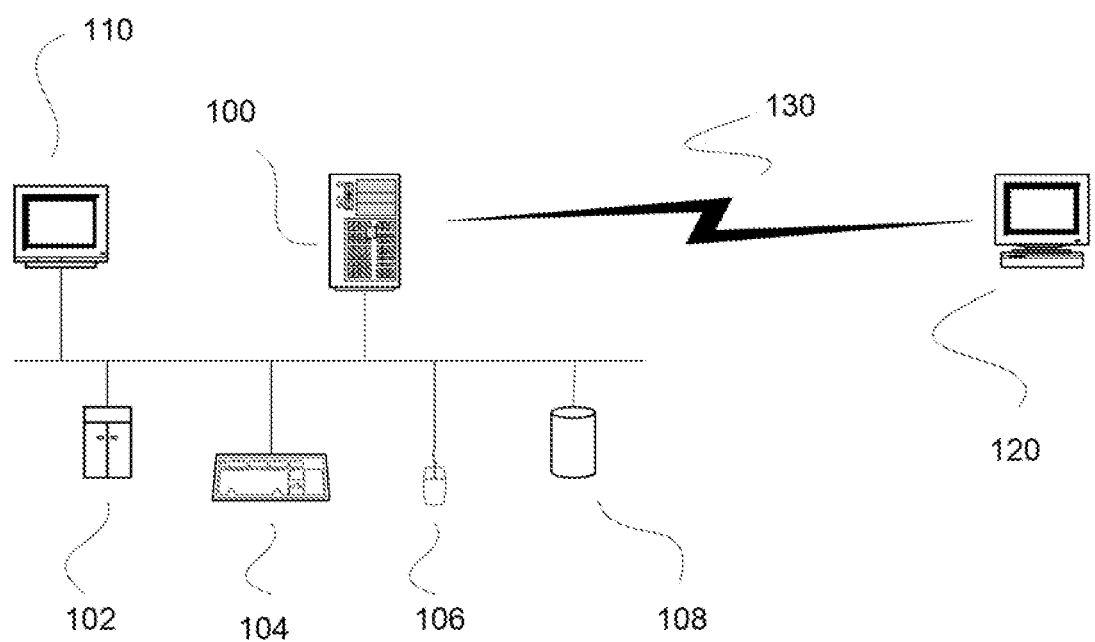
FIG. 1 shows a block diagram of a client/server system in accordance with a preferred embodiment of the present invention.
Figure 2:
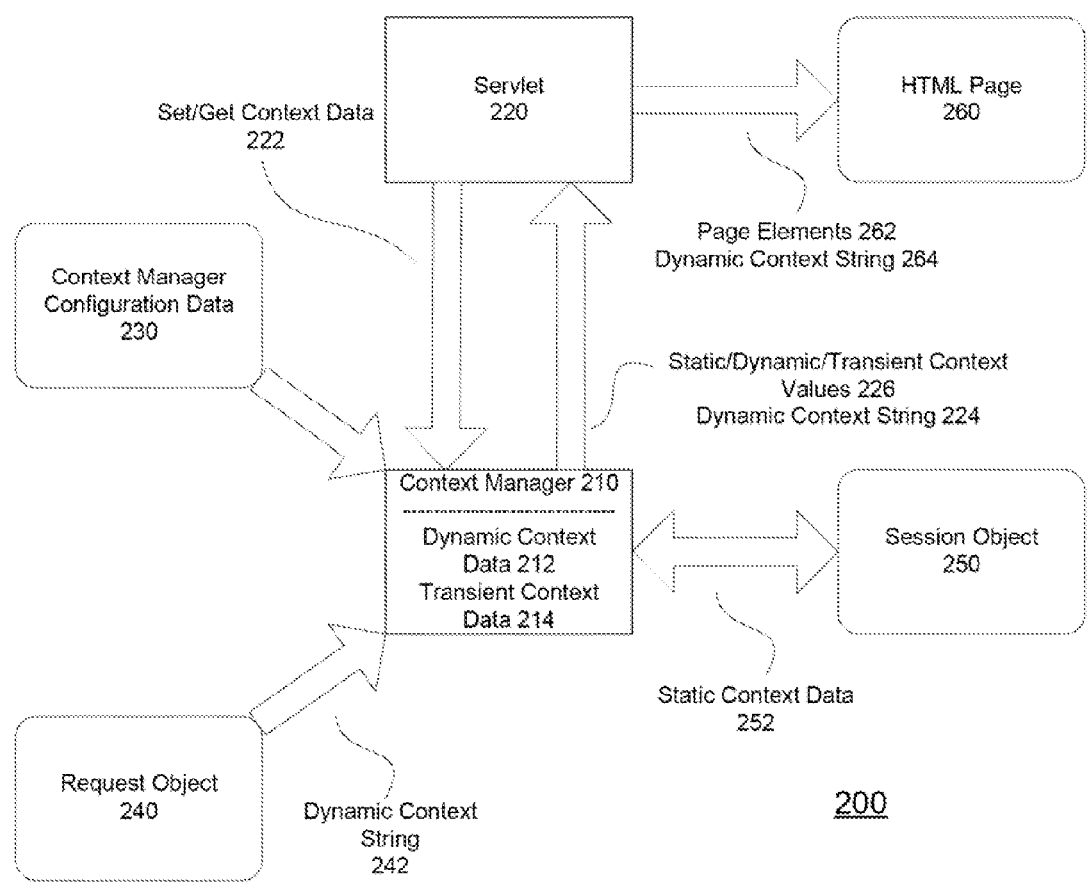
FIG. 2 shows a block diagram of the software components of a context management system in accordance with the preferred embodiment.
Figure 3:
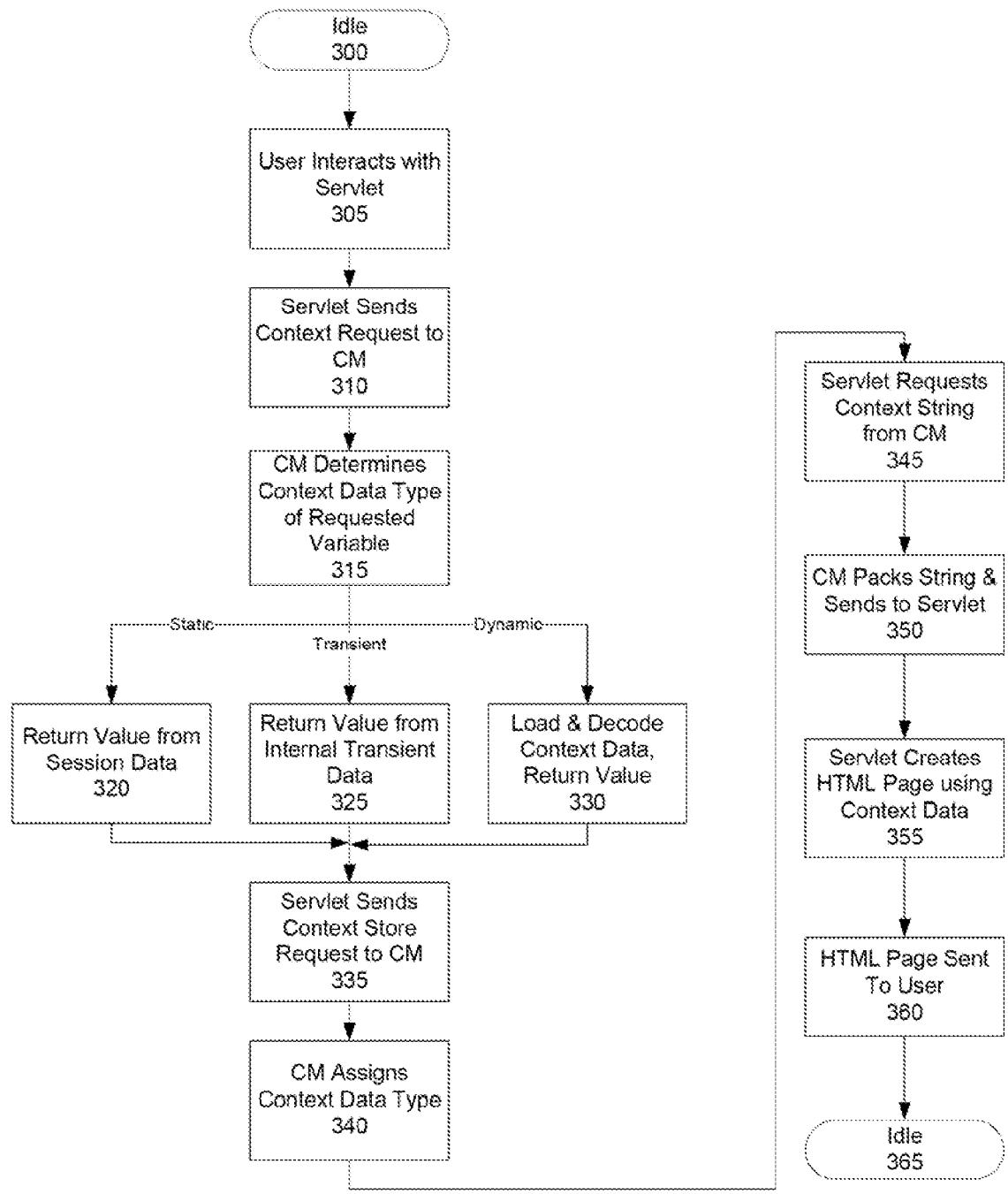
FIG. 3 depicts a flowchart of a context-management process in accordance with the preferred embodiment.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Definitions: Following are short definitions of the usual meanings of some of the technical terms which are used in the present application. (However, those of ordinary skill will recognize whether the context requires a different meaning.) Additional definitions can be found in the standard technical dictionaries and journals.

Static Data: Contextual data that has a duration longer than a single request and is independent of the page flow and the page from which a request is made.

Dynamic Data: Contextual data that has a duration longer than a single request and is dependent on the page flow and the page from which a request is made.

Transient Data: Contextual data that has a duration of only a single request.

The preferred embodiment provides a system and method for context management which addresses the above problems while isolating the context management functions from the other functional code found on the server system. The context management system includes a context manager component which stores and retrieves name-value pairs describing the context in which the current request is being processed. In doing so, three types of context data are distinguished: static, dynamic, and transient. The context manager stores context data regarding each of a user's sessions and page flows, and returns context data in response to requests from the server system. Using this context data, the server system can then interact with the user in a manner appropriate to the user's context.

FIG. 1 shows a block diagram of a client/server system in accordance with a preferred embodiment of the present invention. FIG. 1 includes a server system 100 which communicates with a client system 120. Server 100 can be implemented in any conventional data processing system, and will include processor 102 and storage 108, which is a computer-readable medium. Server 100 can also optionally include keyboard 104 and mouse 106, for user interaction with the server 100, and display 110. Server 100, in this embodiment, is configured to communicate with client 120 by any of the many known methods, represented as communication 130. Communication 130 can be over a local-area network, over the internet, via telephone lines, wireless, or any other known computer communications system.

In the preferred embodiment, the context management system described below is stored and executed on the server 100, and is accessed by a user operating a web browser on client 120. The server 100, in the method described below, provides the web site content which is navigated by the user on client 120.

In an alternate embodiment, however, the context management system described herein is stored and executed on the same system on which the user is browsing. This is the case where the user's system is acting as server 100, and the user is locally accessing the HTML content being managed by the context management system. In this embodiment, the same computer system will be acting as both the server system and the client system.

In either case, the context management system can operate on the server either as an independent software application, or as a software component module within a single larger application. The context management system is accessed by other applications or modules, which otherwise manage the interaction with the user and the creation of HTML content according to the context data.

FIG. 2 shows a block diagram of the software components of a context management system in accordance with the preferred embodiment. Context management system 200 is active on one or more computer systems, which may be configured as network/internet servers, or as standalone systems; for sake of simplicity, this system will be referred to as the server system.

Context management system 200 consists of several different components executing or stored on the server system. The primary components, for the purposes of this application, are context manager 210 and servlet 220. It should be noted that servlet 220 can be any type of functional code which interacts with the context manager 210; however, for the sake of clarity, this component will be referred to simply as "servlet" or "servlet 220" throughout this application.

Static context data 252 has a duration longer than a single request and is independent of the page flow and the page from which a request is made. It is typically constant throughout an entire user session although it can be changed and affects the entire user session when this occurs. Browser actions such as Back, Forward, and New Window must not affect the validity of any static data. The context manager 210 stores its static context data 252 in the session object 250 provided by the servlet 220. Since the amount of static data is generally stable throughout a user session, the scalability concerns are manageable for static data. The amount of static data does not grow each time a user visits a new page.

Dynamic context data 242 has a duration which is longer than a single request and is dependent on the page flow and the page from which a request is made. The dynamic context data 212 may change as a result of browser actions such as Back and Forward, and each browser window may have a different dynamic context. To satisfy this requirement, dynamic context data elements 212 are not stored on the session object. Instead, they are stored by the context manager 210, then passed to the servlet 220 with other static/dynamic/transient context values 226, or in a dynamic context string 224. The servlet 220 then generates a new HTML page 260 which includes the dynamic context from static/dynamic/transient context values 226, in the preferred embodiment, as a dynamic context string 264. Dynamic context string 264 is then used for either hidden page elements 262 in an HTML form, or parameter string in HTML links.

Dynamic context string 242 represents the way in which dynamic context data is stored between requests, while dynamic context data 212 is the in-memory representation of dynamic context while processing a single request.

Typically, as the user navigates the web pages with his web browser, the browser will send a new request object 240 with each browser interaction. The servlet will determine the context data from the browser interaction, and send it to the context manager for handling. For each request object 240, the context manager 210 initializes its dynamic context data 212 from the dynamic context string 242. The request object 240 does not itself change the user's context, it merely provides the dynamic context data 212 that was stored earlier when a link/form was generated.

The request object 240 never causes transient context data 214 to be set. Changes to the dynamic context data 212 and transient context data 214 are only at the direct request of the servlet 220 via set context data requests 222. It should be noted that the state of any context data variable can be changed if needed without reference to or dependency upon the systems or processes making use of that variable. In this way, an application can make changes in state without affecting every component.

The context manager 210 does not itself place context information onto HTML page 260; it just packages the context data as static/dynamic/transient context values 226, or in a dynamic context string 224, and provides it when the servlet 220 sends a set/get context data request 222. The name-value pairs for the dynamic context data 212 are assembled into a URL-style dynamic context string 224, which is encoded so that it can be set as the value of a single hidden form field or URL parameter. It should be noted that the servlet 220 uses set/get context data 212 for manipulation and access to all three types of context data, making the disclosed system a truly unified approach to context management. Further, it should be clear that static/dynamic/transient context values 226 are provided only in response to get context data requests 222 for use by the servlet, and have no direct connection to HTML page 260.

When servlet 220 or other functional code on the server system must make a decision based upon the value of a dynamic context data element 212, it requests the data from the context manager 210, typically using a set/get context data command 222. The context manager 210 examines the current request for a hidden field or a parameter containing the dynamic context data string 242. If one is found, the context manager decodes and unpacks the string to obtain the value. The unpacked context data 212 is saved in the context manager 210 to make subsequent requests for context data more efficient. If a user goes backward in their browser and submits a form from an earlier page, the dynamic context data string 242 in the request will be derived from that form as is required. The same applied to users submitting forms from multiple browser windows.

Transient context data 214 has duration of only a single request. Transient context data elements 214 are stored internal to the context manager 210 for subsequent access during the same request in which they are set. They are not placed on the session object 250 nor on any HTML page 260 sent to the browser. Although transient data elements can be placed on the request object 240 instead of in the context manager 210, it is convenient to have a single place for maintaining all context data, including the transient context data 214.

To further insulate servlet 220 from context management, servlet 220 need not know whether a context data element is static, dynamic, or transient. The context manager 210 reads configuration data that defines the context elements and their type. Servlet 220 just requests access to a desired context element, and the context manager 210 takes care of retrieving or storing the data in a way that guarantees the appropriate lifetime for the data. The set of context elements handled by the context manager 210 can be manually configured, by changing the context manager configuration data 230, to meet the requirements of the server system.

FIG. 3 depicts a flowchart of a context-management process in accordance with the preferred embodiment. It should be noted that the process shown in FIG. 3 includes several sub-processes, such as storing, classifying, and retrieving context variables, which can be performed independently. As such, this particular flow is exemplary, and many steps or sets of steps can be performed in different orders, and can be performed independently of other steps.

In this example, when a user interacts with a web page which is running a context-manager-enabled servlet (step 305), the servlet asks the context manager for the context value associated with Name1 (step 310; the context manager is noted as "CM" in FIG. 3, Name1 is an exemplary context variable). The context manager examines its configuration data to determine the context data type for Name1 (step 315).

If Name1 is static, the context manager returns a value from the static context data stored in the session (step 320). If Name1 is transient, the context manager returns a value from its internally stored transient data (step 325). If Name1 is dynamic, the context manager loads the context data from the current request if not already loaded. It decodes and parses the data, storing it internally. It then returns a value from that internal data (step 330). In all three cases, if the Name1 has no associated value, null is returned.

Next, Servlet asks the context manager to store a value for another variable, Name2, still in the same user request (step 335). The context manager examines its configuration data and sets the value into the static, dynamic or transient state (step 340).

While generating the output HTML, still the same request, the servlet asks the context manager for dynamic context string to store on the page (step 345). The context manager packs the full dynamic context into a string and returns the string (step 350).

The servlet uses the context data to dynamically create a new HTML page (step 355). By using the data from the context manager, the new HTML page is specifically appropriate to that user, that session, and the user's current page flow. Finally, the new HTML page is sent to the user (step 360), and the context management server system will then await the next user interaction (step 365).

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. More-over, none of these claims are intended to invoke paragraph six of 35 USC §112 unless the exact words "means for" are followed by a participle.

What is claimed is:

1. A method for managing context information in a computer-user interaction, comprising:
   receiving, by a server data processing system, a request object from a user, the request object associated with a first web page and including first dynamic context data;
   requesting, by the server data processing system, user context data from a context manager component;
   returning, from the context manager component, a context result associated with the user context data, the context result dependent on a web page flow of the user and the first web page;
   creating a customized web page corresponding to the context result by the server data processing system; and
   sending the customized web page to the user.

2. The method of claim 1, wherein the context manager component is an independent software application executing on the server data processing system.

3. The method of claim 1, further comprising providing the first dynamic context data to the context manager component.

4. The method of claim 1, further comprising classifying user context data as static data, dynamic data, or transient data.

5. The method of claim 1, further comprising receiving and storing the user context data in the context manager component.

6. The method of claim 1, wherein the request object is received over a computer network.

7. The method of claim 1, wherein the context result includes second dynamic context data that is stored in the customized web page.

8. The method of claim 1, wherein the first dynamic context data is stored in the context manager component.

9. The method of claim 1, further comprising determining context data from a user interaction and storing the context data in the context manager component.

10. A tangible machine usable medium storing instructions that, when executed, cause a data processing system to perform the steps of:
    receiving a request object associated with a first web page and including first dynamic context data;
    requesting user context data from a context manager component;
    returning a context result associated with the user context data, the context result dependent on a web page flow of a user and the first web page;
    creating a customized web page corresponding to the context result; and
    sending the customized web page to the user.

11. The machine usable medium of claim 10, also storing instructions that cause the data processing system to perform the step of providing the first dynamic context data to the context manager component.

12. The machine usable medium of claim 10, also storing instructions that cause the data processing system to perform the step of classifying user context data as static data, dynamic data, or transient data.

13. The machine usable medium of claim 10, also storing instructions that cause the data processing system to perform the step of receiving and storing the user context data in the context manager component.

14. The machine usable medium of claim 10, wherein the request object is received over a computer network.

15. The machine usable medium of claim 10, wherein the context result includes second dynamic context data that is stored in the customized web page.

16. The machine usable medium of claim 10, wherein the first dynamic context data is stored in the context manager component.

17. The machine usable medium of claim 10, also storing instructions that cause the data processing system to perform the step of determining context data from a user interaction and storing the context data in the context manager component.

18. A data processing system comprising a processor and storage, the data processing system configured to perform the steps of:
    receiving a request object associated with a first web page and including first dynamic context data;
    requesting user context data from a context manager component;
    returning a context result associated with the user context data, the context result dependent on a web page flow of a user and the first web page;
    creating a customized web page corresponding to the context result; and
    sending the customized web page to the user.

19. The data processing system of claim 18, wherein the context result includes second dynamic context data that is stored in the customized web page.

20. The data processing system of claim 18, further configured to perform the step of determining context data from a user interaction and storing the context data in the context manager component.

* * * * *